June 19, 1956 — A. L. ZANOLA — 2,750,860
SUB-SOIL AERATING CULTIVATOR
Filed Nov. 8, 1950 — 3 Sheets-Sheet 1
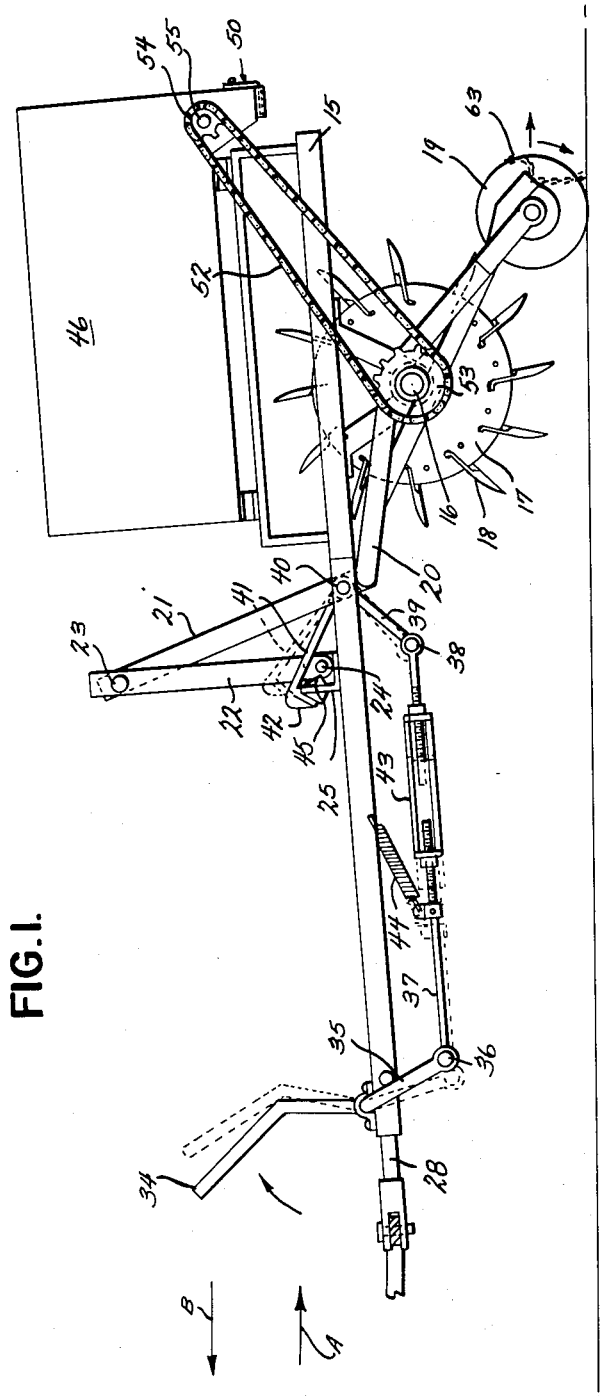
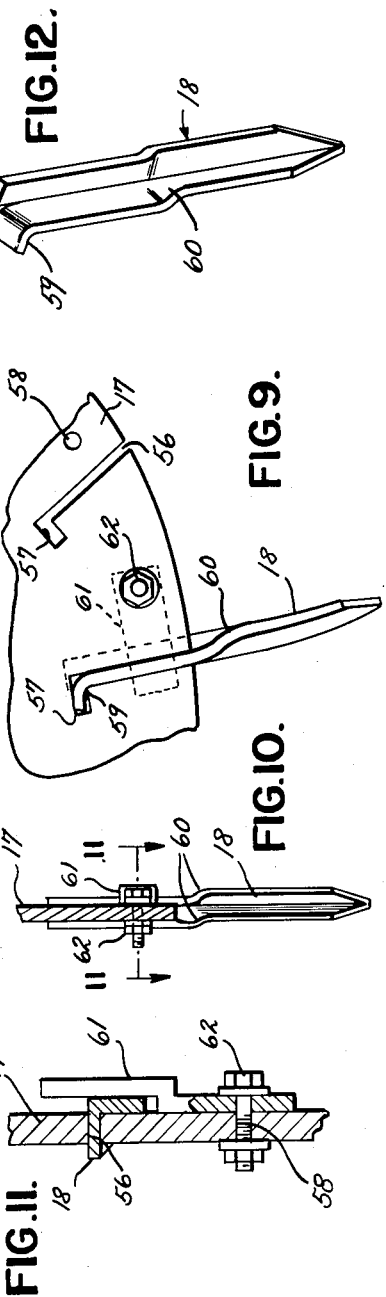
INVENTOR
ANGELO L. ZANOLA
BY Wilkinson & Mawhinney
ATTORNEYS

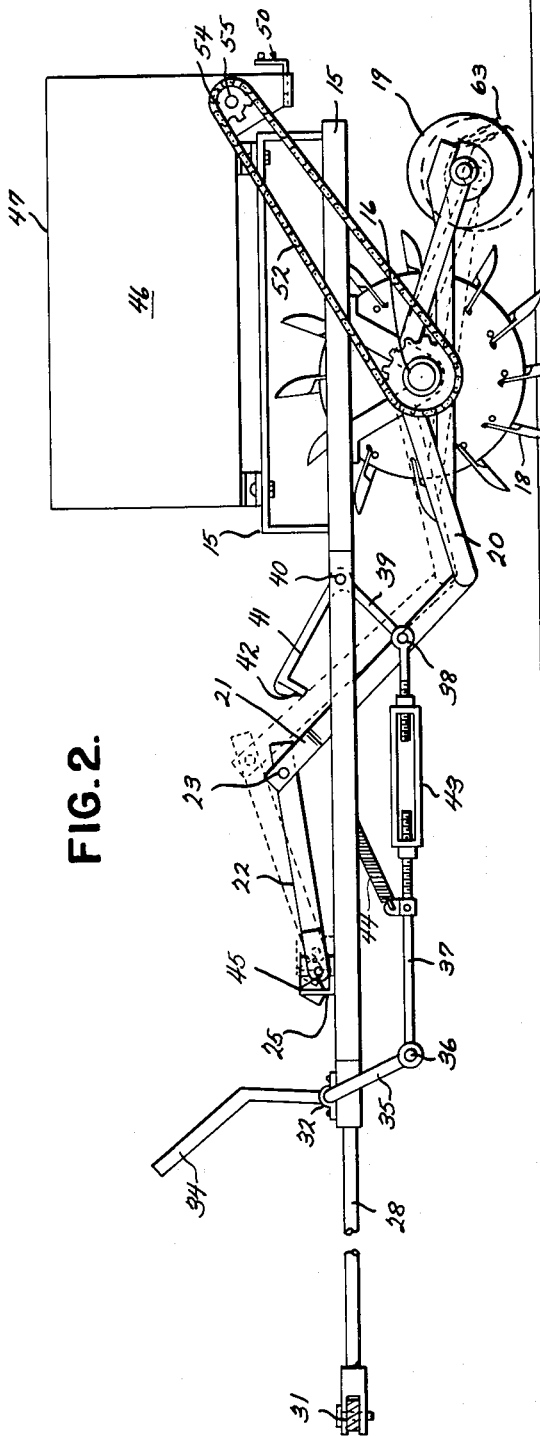
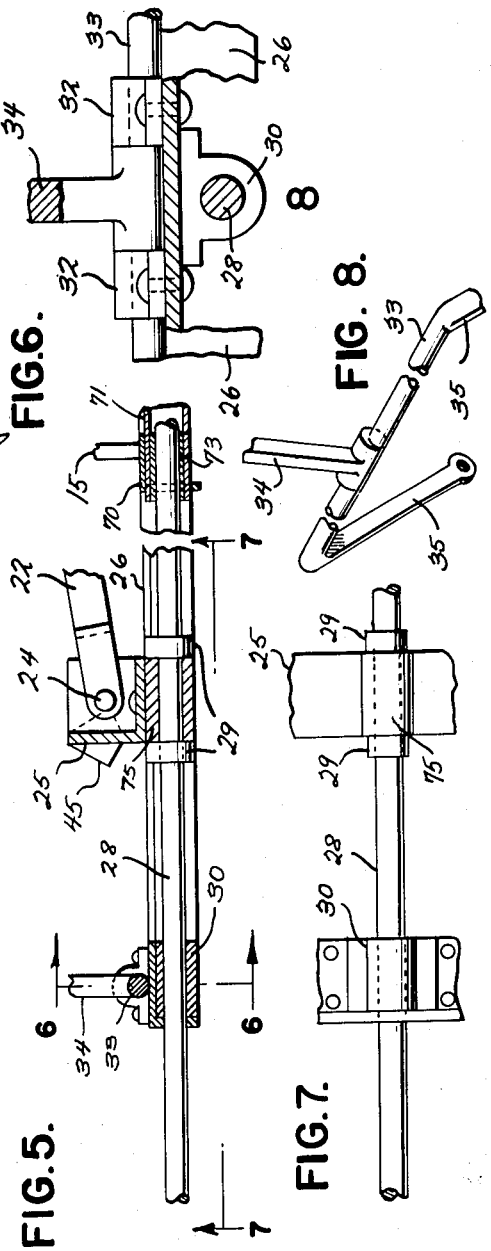

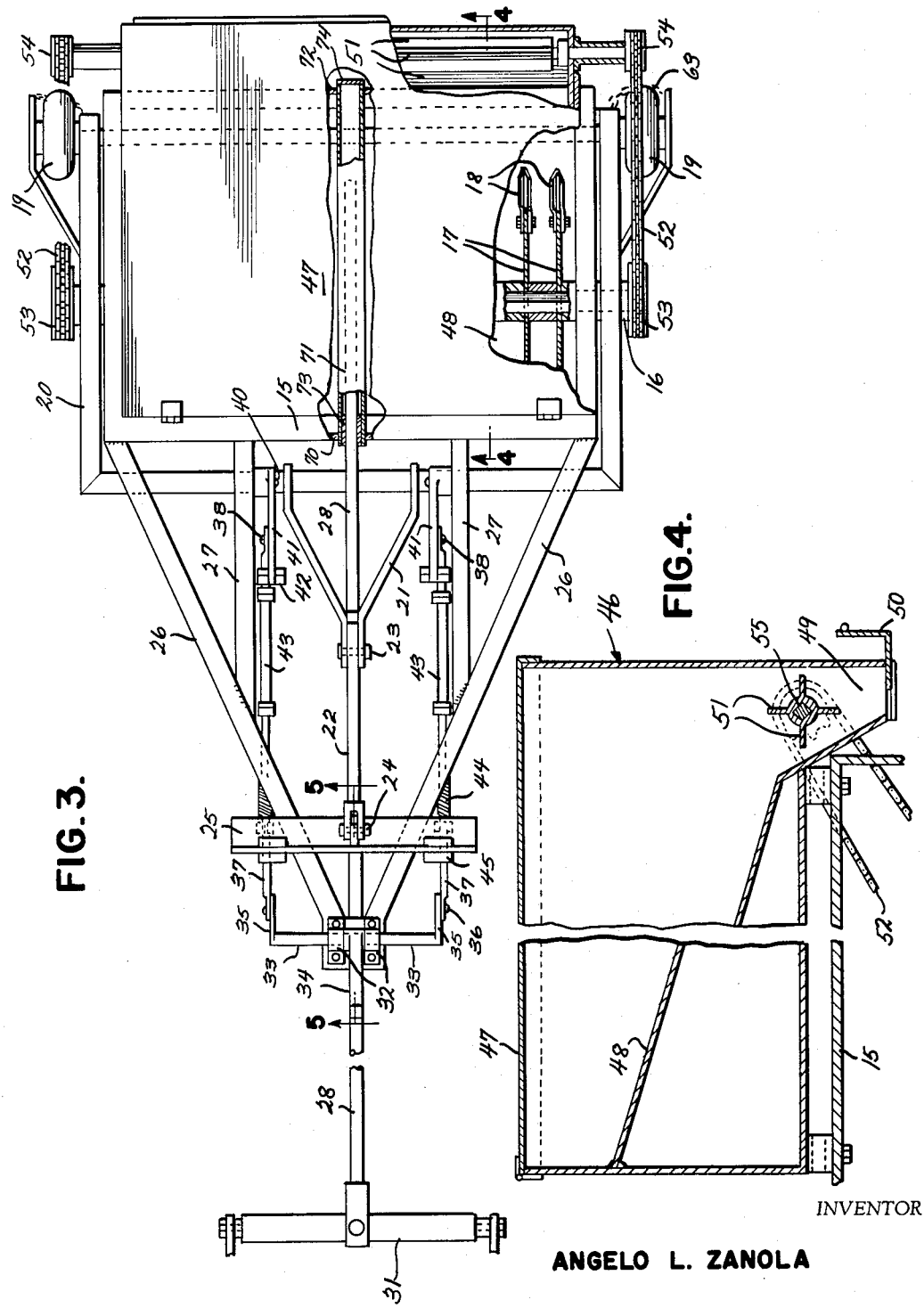

United States Patent Office 2,750,860
Patented June 19, 1956

2,750,860

SUB-SOIL AERATING CULTIVATOR

Angelo L. Zanola, Memphis, Tenn.

Application November 8, 1950, Serial No. 194,693

2 Claims. (Cl. 97—46.85)

The present invention relates to improvements in subsoil aerating cultivators and has for an object to provide an improved machine for use primarily on golf courses to perforate the soil which is later fertilized.

Another object of the invention is to provide a machine which both perforates the soil and also supplies the fertilizer as an incident to the perforating operation in which the distribution of the fertilizer follows closely upon the perforating action, it being the intention that the fertilizer be raked into the perforations made by the cultivator.

A further object of the invention is to provide an improved machine of this character in which an improved form of tooth and tooth mounting in discs of the cultivator are provided for more efficient perforating and to produce a stronger and more rigid construction.

A still further object of the invention is to provide an improved fertilizer attachment for the cultivator in which an agitating paddle or the like is provided in the delivery throat of the fertilizer hopper and container by which to insure the delivery of the fertilizer in proper quantities and at a uniform rate.

A still further object of the invention is to provide an improved cultivator in which smooth-tired wheels are carried by a movable frame for the purpose of controlling the lowering and raising of the cultivator teeth whereby the machine may roll on the smooth-tired wheels when going toward and from the field to be cultivated; and in in which tractor-operated control members operate to shift the smooth-tired wheels into and out of operation with accompanying lifting and lowering of the cultivator teeth.

With the foregoing and other objects in view, the invention will be more fully described hereinafter, and will be more particularly pointed out in the claims appended hereto.

In the drawings, wherein the symbols refer to like or corresponding parts throughout the several views, Figure 1 is a side elevational view of an improved subsoil aerating cultivator constructed in accordance with the present invention and showing the cultivator teeth in the raised inoperative position.

Figure 2 is a similar view showing the cultivator teeth lowered into contact with the ground.

Figure 3 is a top plan view of the machine with parts broken away and parts shown in section.

Figure 4 is a vertical sectional view taken through the fertilizer container and hopper on the line 4—4 in Figure 3.

Figure 5 is a fragmentary longitudinal section taken on the line 5—5 in Figure 3.

Figure 6 is a fragmentary transverse section taken on the line 6—6 in Figure 5.

Figure 7 is a bottom plan view of the parts shown in Figure 5 and taken along the line 7—7 of Figure 5.

Figure 8 is a fragmentary perspective view of the hand actuated control.

Figure 9 is an enlarged fragmentary side view of one of the cultivator discs showing a slot and an attached blade.

Figure 10 is a cross-section through one of the discs showing a blade applied thereto.

Figure 11 is a cross-section taken on the line 11—11 in Figure 10, and

Figure 12 is a perspective view of a form of tooth employed.

Referring more particularly to the drawings 15 designates cultivator frame of any appropriate form and construction having affixed thereto an axle 16 on which a number of cultivator discs 17 are mounted having the earth-penetrating teeth 18.

Smooth-tired wheels 19 are mounted on the rear end of a lifting frame 20 which is pivotally fitted about the axle 16. A lifting yoke 21 is rigidly connected at its rear end to the forward portion of the lifting frame 20 and is pivotally connected at its forward end by the pivot 23 to the upper rear end of the raising arm 22, the forward end of the raising arm 22 being connected by the pivot 24 to a sliding lock bar 25 which is slidably supported upon forwardly extending braces 27 connected to the cultivator frame 15 and to intermediate portions of the converging members 26.

The cultivator draw bar 28 rotates and slides in sleeve bearings 30 and 73. The sleeve bearing 30 may be affixed beneath the forward convergent ends of the diagonal frame members 26. The rear bearing 73 is mounted in a cross front member 70 of the frame which extends crosswise at the rear ends of the diagonal members 26. A tubing 71 houses the rear end of the draw bar 28 and is mounted in the front and rear cross members 70 and 72 of the frame, which members may be of angle iron construction. The tubing may be closed by a rear end cap 74. The tubing 71 is necessary to keep dirt and trash thrown from the cultivator teeth away from the bearing surfaces. The tubing 71 and also the bearing 73 if desired may project forwardly of the cross front member 70. The tubing may be welded or otherwise affixed to the rear cross member 72.

Between the bearings 30 and 73 the draw bar 28 fits rotatably through a sleeve 75 affixed below the sliding lock bar 25. Collars 29 are affixed to the draw bar 28, one at each end of the sleeve 75 to permit rotation of the draw bar 28 in the sleeve 75 but to entrain the sleeve 75 and lock bar 25 to move back and forth with the draw bar 28. See Figures 5 and 6.

The draw bar 28 is made freely rotatable as required by the irregular terrain over which the cultivator operates in relation to its tractor or power source. These irregular terrains can be often found around golf course greens. Modern tractors have rigid tow bars and the tractor will therefore rotate the draw bar in its bearings when the tractor and cultivator rock irregularly on the longitudinal axes incident to the movement over surface ground which is irregular.

The cultivator draw bar 28 extends forwardly and is coupled to a tractor hitch 31 or other source of draft power.

Above the sleeve bearing 30 and also supported by the converging members 26 are transversely spaced bearings 32 for a rock shaft 33 adapted to be manually rocked back and forth by a handle 34 convenient to the hand of the operator of the tractor. The handle connection is made fixedly to the rock shaft 33 between the bearings 32 as shown more particularly in Figure 6.

The rock shaft 33 has affixed to the ends thereof dependent arms 35, the lower ends of which are pivoted at 36 to links 37 the rear ends of which are pivoted at 38 to the lower arms 39 of bell crank levers fulcrumed at 40 on the cultivator frame and having upper arms 41 carrying at the forward free ends thereof locking lugs 42 which are adapted to engage over the sliding locking bar 25 as shown in Figure 1.

Turn buckles 43 may be included in the links 37 for the purpose of adjusting the lengths of these links to insure that the locking lugs 42 properly engage the sliding locking bar 25. Coil springs 44 are connected between the links 37 and the cultivator frame for the purpose of biasing the locking lugs 42 to a locked position upon the locking bar 25.

Such locking bar 25 may have inclined surfaces 45 arranged in the path of the locking lugs 42 to cause such lugs to ride upwardly and distend the springs 44 when the locking bar 25 is moved rearwardly against the locking lugs 42.

As shown more particularly in Figure 4 a fertilizer container 46 is mounted on the cultivator frame 15 having an upper hinged or removable cover for loading the fertilizer into the container 46, and interiorly provided with an inclined bottom 48 which slopes downwardly and rearwardly to a discharge mouth 49 under the control of a suitable adjustable discharge gate 50.

In the mouth 49 is arranged a rotary paddle or agitating wheel 51 having a suitable number of radially projecting vanes or blades and rotatably mounted so as to break up the lumps of fertilizer and insuring the uniform distribution of the fertilizer and also preventing clogging of the throat 49.

The wheel 51 may be driven by any appropriate drive connections, for instance the chains 52 engaging the sprockets 53 and 54 fast on the shafts 16 and 55 respectively, the latter being the shaft on which the paddle wheel 51 is fixedly mounted.

Referring more particularly to Figures 9 to 12, the discs 17 are shown as formed with slots 56 opening through the outer edges thereof and having L-shaped inner offset recesses 57. The discs are also provided with perforations 58 adjacent the slots 56 on the sides opposite the recesses 57.

The teeth 18 are preferably of angle construction and have pointed lower ends and upper and lower sections which are twisted or relatively offset with respect to one another at the intermediate portion 60. The upper end of one flange of each tooth is provided with a curved lug 59 adapted to fit into the offset recess 57 while its flange lies through the slot 56 with the offset portion 60 of the tooth just beyond the periphery of the disc 17. The other disc flange will lie flat against a surface of the disc 17. Locking washers or clamps 61 are fitted against the latter flanges of the teeth 18 and such clamps may be held in place by nuts and bolts 62 or other suitable fastenings. The twisted portion 60 brings the apex portion of the angle iron teeth facing forwardly of the machine at the lower portion of the discs 17.

Binding chains 63 are looped about the wheels 19, the ends of the chains 63 being connected eccentrically of the wheels 19 at preferably two portions of the lifting frame 20 whereby when the wheels 19 are backed the chains will bind on such wheels and hold the same from rotation as indicated in Figure 1.

In operation, Figure 1 of the drawings shows the cultivator teeth 18 in the up or tow position. This is the non-working position.

In order to place the cultivator in working position, the towing tractor, which is the normal power used to operate the cultivator, is moved backwards on the hitch 31, requiring the cultivator to roll backward on the wheels 19 and thus to roll over the chains or at least to roll the chains in such position as to bind and brake the wheels 19. The handle 34 is then pushed by hand backwards, as indicated in dotted lines in Figure 1 thus pulling forwardly upon the links 37 and rocking the bell crank levers 39, 41 to a position where the locking lugs 42 are lifted clear of the sliding locking bar 25. While continuing to hold handle 34 in the backward position, the tractor is now moved forward. In doing so it will move with it the draw bar 28 and the sliding lock bar 25, the cultivator being held against motion by the binding chains 63. After the lock bar 25 clears the catches or lugs 42, the handle 34 may be released. The springs 44 will thereupon return the parts of the locking mechanism to the normal full line position shown in Figure 1.

The forward motion of the tractor causes the sliding lock bar 25 to be moved forwardly on the members 26 and 27, pulling with it the raising arm 22 and the lifting yoke 21 from the position of Figure 1 to that of Figure 2; thereby pivotally moving the lifting frame 20 on the axle 16 to raise the wheels 19 off the ground, and consequently setting the teeth 18 in the ground.

The cultivator is now in working position as shown in Figure 2. The tractor thereupon pulls the cultivator through the field and the teeth 18 perforate the ground while fertilizer is deposited in rear of the cultivator teeth 18 in quantity as controlled by the setting of the gate 50.

After the work in the field has been accomplished the cultivator teeth may be raised to the non-working position by backing up the tractor which will shift the draw bar 28 backwardly in its sleeve bearings 30 and 73 and push the wheels 19 down to a position where they may be rotated backwardly to run over the chains 36 or to cause the chains to bind on the wheels and create a braking action on the wheels 19. Further backward motion of the tractor causes the sliding lock bar 25 to slide rearwardly and to push rearwardly the raising arm 22. Thus lifting the yoke 21 and rotating the lifting frame 20 about the axle 16. This action will lift the cultivator teeth 18 off the ground. The tractor is backed until the sliding lock bar 25 snaps back of the locking lugs 42. The tractor may now be moved forwardly with the cultivator resting wholly on the smooth-tire wheels 19.

It will be noted that the lifting frame 20 is composed of downwardly-divergent members extending rearwardly and forwardly from the central angled portion which is hung on the axle 16, the rear members journalling the wheels 19 and the forward ends of the forward members rigidly connected to the lower rear ends of the diagonally disposed lifting yoke 21.

Although I have disclosed herein the best form of the invention known to me at this time, I reserve the right to all such modifications and changes as may come within the scope of the following claims.

What I claim is:

1. A draft operated implement lift comprising an implement frame, an implement, rotary means for mounting said implement rotatably on said frame, a lifting frame having a forward end portion and a rearward end portion pivotally mounted on said rotary means intermediate its forward and rearward end portions, for oscillating movement thereabout, ground wheels on the rearward portion of the lifting frame, draft means mounted for back and forth substantially horizontal movement on the implement frame, and linkage means connected to said draft means and to the forward end portion of the lifting frame for transmitting the movement of the draft means to the lifting frame to swing the lifting frame on its pivot to move the wheels into and out of engagement with the ground.

2. A draft operated implement lift comprising an implement frame, an implement, rotary means for mounting said implement rotatably on said frame, a lifting frame having a forward end portion and a rearward end portion pivotally mounted on said rotary means intermediate its forward and rearward end portions for oscillating movement thereabout, ground wheels on the rearward portion of the lifting frame, draft means mounted for back and forth substantially horizontal movement on the implement frame, a slidable member on the implement frame entrained for movement with said draft means, and linkage means connected to said slidable member and to the forward end portion of the lifting frame for transmitting the horizontal movement imparted to the slidable member by the draft means to the forward end portion of the lifting frame for oscillating the lifting frame about its pivot to move the ground wheels into and out of engagement with the ground, brake means for holding the ground wheels against rotation when the drafting means is moved backwards, and catch means engaging said slidable member for holding the lifting frame and ground wheels in ground engaging position.

References Cited in the file of this patent

UNITED STATES PATENTS

| | | |
|---|---|---|
| 373,159 | Svendsen | Nov. 15, 1887 |
| 622,162 | Pattison | Mar. 28, 1899 |
| 648,752 | Jones | May 1, 1900 |
| 975,786 | Niemie | Nov. 15, 1910 |
| 1,475,879 | Reynolds | Nov. 27, 1923 |
| 1,490,502 | Barnhart | Apr. 15, 1924 |
| 1,571,030 | Weaver | Jan. 26, 1926 |
| 1,800,587 | Appleby | Apr. 14, 1931 |
| 1,855,605 | Lindeman | Apr. 26, 1932 |
| 1,916,508 | Grossi | July 4, 1933 |
| 1,947,640 | Brodersen | Feb. 20, 1934 |
| 2,139,306 | Gaffney | Dec. 6, 1938 |
| 2,147,696 | Gier | Feb. 21, 1939 |
| 2,286,305 | Priestley | June 16, 1942 |
| 2,388,553 | Kraus | Nov. 6, 1945 |
| 2,464,038 | Horth | Mar. 8, 1949 |
| 2,468,297 | Jones | Apr. 26, 1949 |
| 2,535,441 | McGehee | Dec. 26, 1950 |
| 2,580,236 | Mascaro | Dec. 25, 1951 |
| 2,631,389 | Stovall et al. | Mar. 17, 1953 |

FOREIGN PATENTS

| | | |
|---|---|---|
| 134,343 | Great Britain | Nov. 5, 1919 |